June 23, 1925.  1,543,502
H. M. HOBART
DYNAMO ELECTRIC MACHINE
Filed March 25, 1924
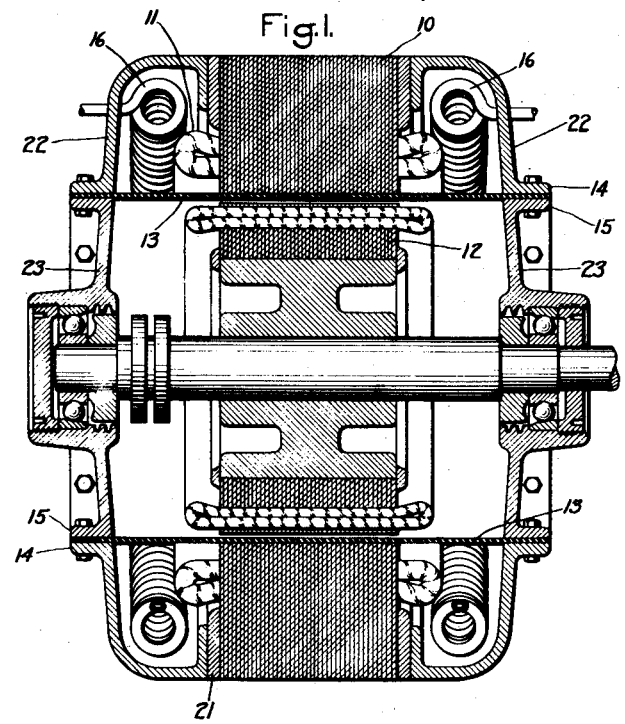
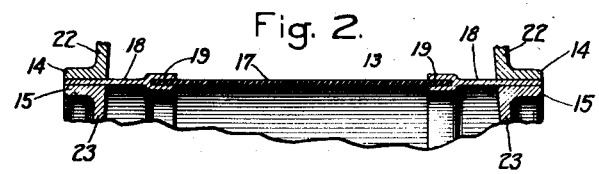
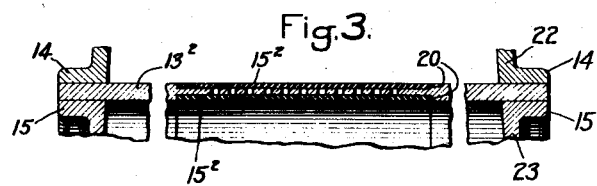
Inventor:
Henry M. Hobart,
by
His Attorney.

Patented June 23, 1925.

1,543,502

UNITED STATES PATENT OFFICE.

HENRY M. HOBART, OF NISKAYUNA, NEW YORK, ASSIGNOR TO GENERAL ELECTRIC COMPANY, A CORPORATION OF NEW YORK.

DYNAMO-ELECTRIC MACHINE.

Application filed March 25, 1924. Serial No. 701,858.

*To all whom it may concern:*

Be it known that I, HENRY M. HOBART, a citizen of the United States, residing at Niskayuna, in the county of Schenectady, State of New York, have invented certain new and useful Improvements in Dynamo-Electric Machines, of which the following is a specification.

My invention relates to dynamo electric machines and particularly to such machines which are provided with means for enclosing the stator windings in an insulating and cooling medium, such as oil, in contact therewith.

The beneficial results obtained by immersing electrical windings in an oil, such as is commonly used for this purpose, are well known. Its use, however, in the past has been limited principally to stationary apparatus, such as transformers and the like. Apparatus of this character, having no rotating parts is well adapted to the use of oil in this manner, since all parts of the device can be totally immersed. In the case of rotary apparatus, however, it is usually impractical to immerse the winding of the rotary parts owing to the relatively high viscosity of oil as compared with air, which would retard the moving parts and increase the running light losses within the machine and therefore decrease its efficiency.

In large dynamo electric machines and particularly in alternating current motors and generators it is usual to locate the high voltage windings on the stationary portion of the machine. In such machines it is possible to improve the insulation and cooling of such machines to such an extent that the use of means which will permit the stator windings to be immersed in a medium such as a gas or oil is warranted. The rotor under these conditions is permitted to rotate in air as is standard practice.

In order to accomplish this it is necessary to provide a separating partition between the stator and rotor which will maintain the oil about the stator windings, and at the same time not interfere with the magnetic circuit between the stator and rotor windings. Such a partition to be efficient must be non-metallic or be one which has considerable resistance to eddy currents. In accordance with my invention, I provide a partition which possesses all the above desirable features, which is simple and is easily constructed.

For a better understanding of my invention, reference may be had to the following description taken in connection with the accompanying drawing, in which Fig. 1 is a sectional elevation of a dynamo electric machine embodying my invention, and Figs. 2 and 3 show modifications of a partition built in accordance with my invention.

Referring to Fig. 1, a dynamo electric machine is shown having a stator 10 provided with a winding 11 which is adapted to be immersed in an insulating and cooling medium, such as oil. Mounted and adapted to rotate within the stator 10 is a rotor 12 and interposed between the stator 10 and rotor 12 in the air gap is a partition 13 of non-magnetic material and high electrical resistance which mechanically separates the two. In the particular arrangement shown, the partition 13 is composed of a cylinder of a phenol condensation product or the like. It may be made of shellaced paper or a paper impregnated with a phenol condensation product. The stator 10 is mounted in a frame 21 which is provided with end frames 22. The end frames 22 are provided with flanges 14 which cooperate with similar flanges 15 on end members 23 to secure said end members in position and provide a support for the rotor bearings. The partition 13 is supported between the stator 10 and rotor 12 by being interposed between the flanges 14 on the end frames 22 and the flanges 15 on the end members 23. After the partition 13 has been placed in position, the flanges 14 and 15 are bolted or otherwise secured together to thus provide an oil tight partition between the stator 10 and the rotor 12. As a result of the above construction, I provide an effective partition between the stator and the rotor which will maintain the liquid or other medium in contact with the stator windings 11 without interfering with the successful operation of the machine and also provide an arrangement of the parts which can be assembled and disassembled with a minimum of inconvenience. The enclosing casing can be of any convenient shape and size depending upon the results desired, for instance, if used to contain an insulating medium it can be made relatively small and where cooling is of primary importance it can be made relatively large to provide for a large amount of cooling medium and radiating surface. The cooling capacity of the liquid or other medium within the casing can also be increased by additional cooling means. In the drawing I have shown coils of pipe 16, which when connected to a water supply permit water to circulate therethrough and carry off a considerable portion of the heat from the cooling medium.

In addition to improved insulation and cooling of the machine, the oil, when oil is employed, also protects the windings from moisture when used in damp places such as in hydro-electric stations. It also keeps the windings free from dirt. Another benefit which results from immersing the windings 11 in oil is that the end turns can be made much shorter than is permissible in air. When these end turns are exposed to air they have to be made large to provide creepage surface to thus prevent puncture of the windings at these points due to corona. When immersed in oil the deteriorating effect of corona on the insulation is substantially eliminated and as a result the life of the insulation is materially lengthened and its properties improved. This is also the case when the windings are immersed in a gas such as hydrogen. A saving in the cost of the insulation might also be effected by wrapping the windings with a porous tape of cotton or other like material and permitting the oil or gas to permeate the tape and come into contact with the conductors, the tape serving primarily to separate the conductors from each other and the slots, in much the same manner as is commonly practiced in transformer construction. As an alternative, spacers may be provided in the conductor slots to provide channels between the windings and the sides of the slots in which case the insulating medium may circulate freely therethrough.

In Fig. 2, the partition 13 is shown composed of three separate pieces, a middle section 17, which is composed of non-magnetic material and end sections 18 of a suitable metal which can be welded or otherwise secured to the frame of the machine. In this embodiment the end pieces are provided with circumferential groves 19 into which the middle section 17 is clamped or otherwise secured to provide an oil tight joint between the sections.

Fig. 3 is a modification of the partition shown in Fig. 1. The middle section is perforated and made thinner by providing annular recesses 20 on each side of the partition 13$^a$ and the insulating material 15$^a$ is placed in these annular recesses. The perforations in the middle section are so shaped and arranged that a relatively high resistance to circulating and eddy currents is established and thus heating of the partition 13 at this point is materially reduced. These perforations may be filled with any suitable filling such as shellaced pulp or a phenol condensation product before the covering 15$^2$ is applied and thus a smooth surface can be secured at the middle section. This construction provides a partition which is smooth on each side and of sufficient strength to withstand the pressure caused by the insulating or cooling medium.

From the above it will be seen that I have provided a means for maintaining an insulating and cooling medium in contact with the stator windings of a rotary type of dynamo electric machine, which will not interfere electrically with the successful operation of the machine and generally improve the machine by reducing corona about the windings, improving the insulation and increasing the cooling so that the machine may be operated at higher current density and higher voltages.

While I have shown and described the dynamo electric machine having an annular enclosing casing which is completely closed, I desire to have it understood that the casing can be constructed with the top open, and a cover provided in the same manner as is customary with other immersed electrical apparatus. The casing may also be provided with an auxiliary storage tank or conservator to take care of the expansion and contraction of the oil due to changes in temperature and also prevent sludging of the oil.

Although I have described my invention with considerable detail and with respect to certain particular forms of construction, I do not desire to be limited to such details since many changes and modifications may well be made without departing from the spirit and scope of my invention.

What I claim as new and desire to secure by Letters Patent of the United States, is,—

1. In a dynamo electric machine, the combination of a frame, a stator winding, a rotor, and a metal partition comprising a perforated middle section having insulating material disposed on each side thereof for sealing said perforations and non-perforated end sections, said middle section lying in the air gap between said stator winding and said rotor, said end sections cooperating with said middle section and said frame to form a casing around said stator winding for containing an insulating medium.

2. In a dynamo electric machine, the combination of a frame, a stator winding, a rotor, and a partition extending axially between said stator and rotor and cooperating with said frame to form a casing about said stator winding, said partition having a reduced middle section formed by a depression on its inner and outer surfaces, holes connecting said depressions and insulating material in said depressions and holes, said reduced section being located within the air gap between said stator winding and said rotor.

In witness whereof, I have hereunto set my hand this 24th day of March, 1924.

HENRY M. HOBART.